H. LUER.
WASHING MACHINE.
APPLICATION FILED AUG. 11, 1916.
1,210,959.
Patented Jan. 2, 1917.
2 SHEETS—SHEET 1.
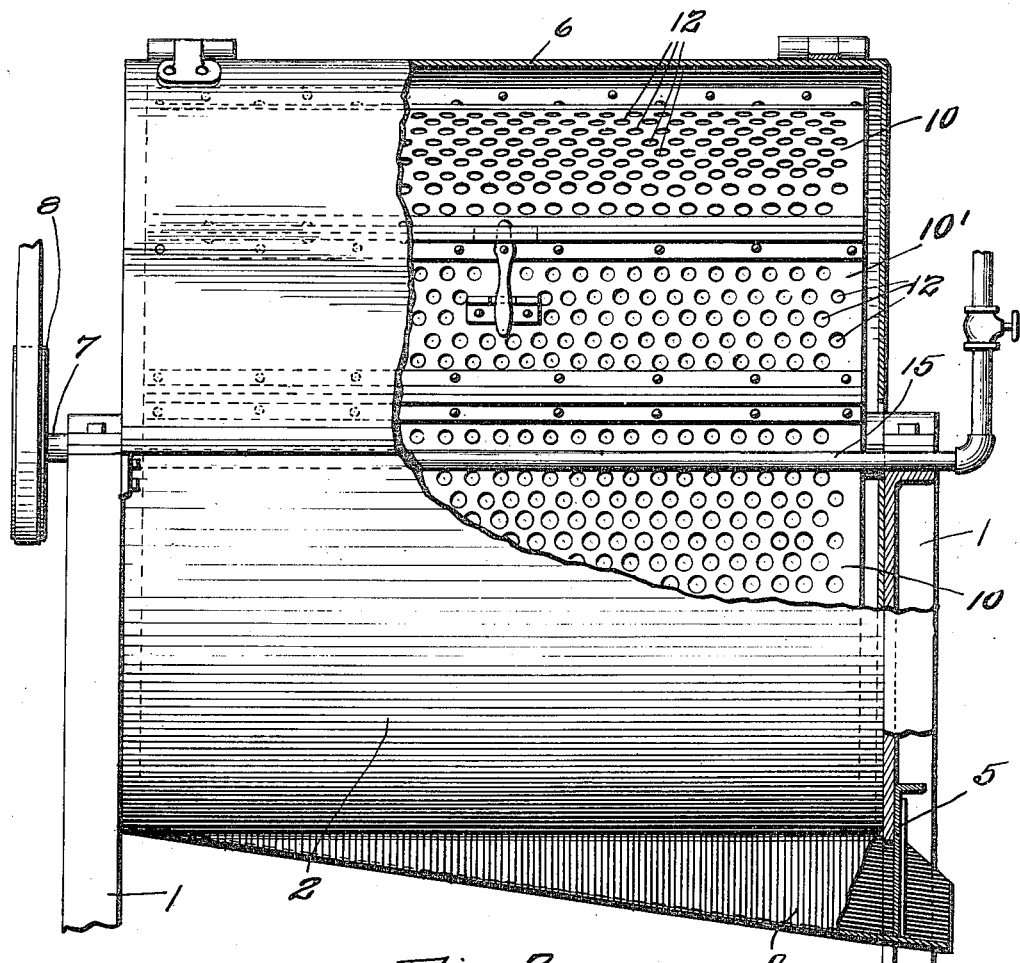
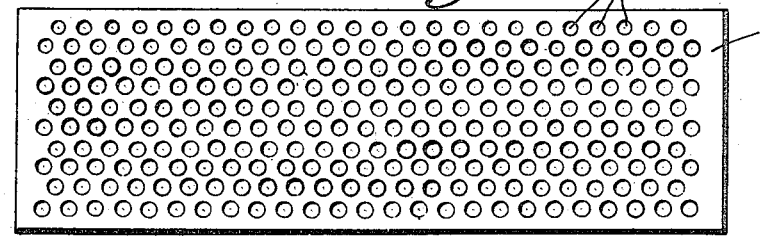
Inventor
Herman Luer

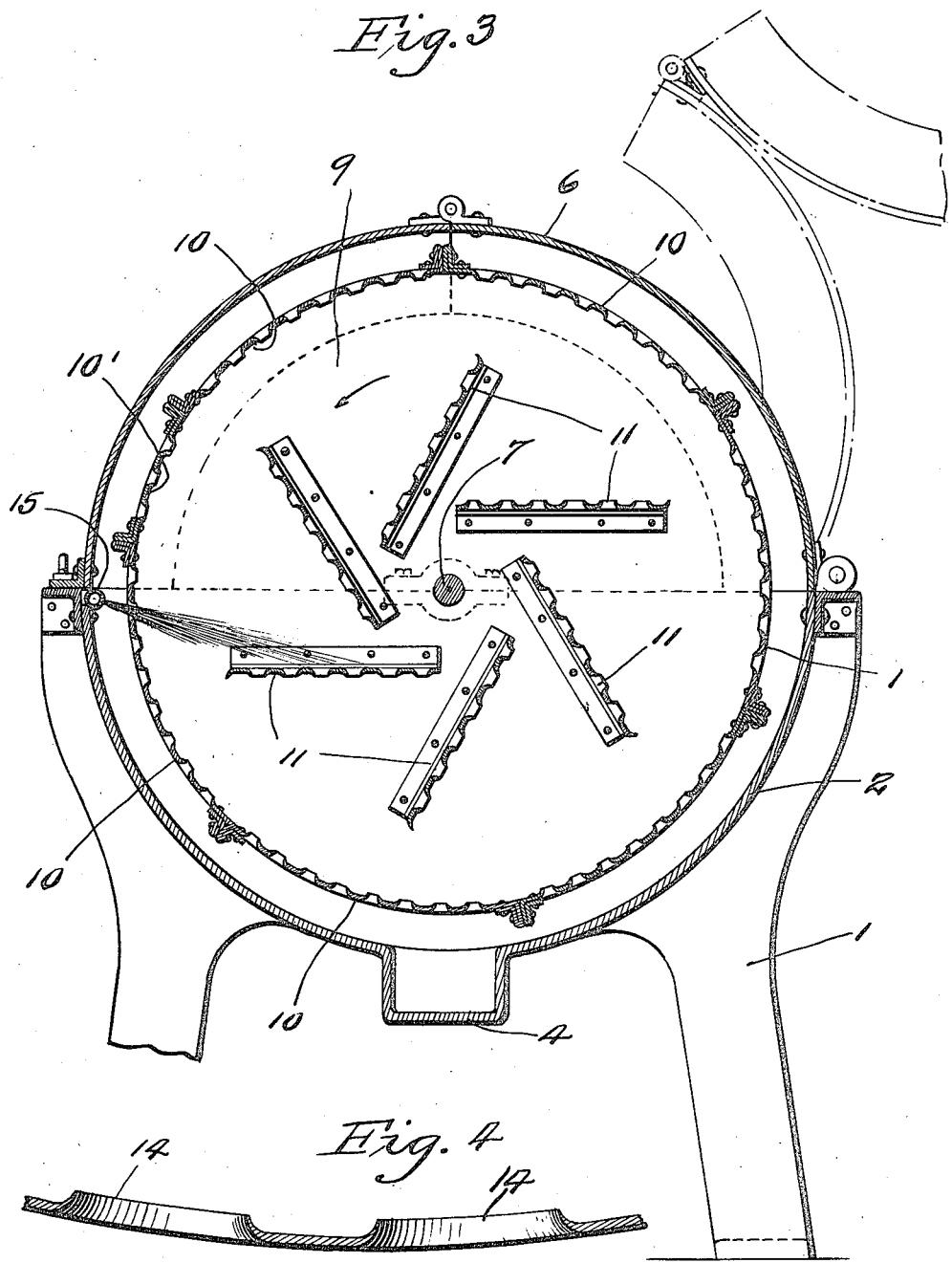

UNITED STATES PATENT OFFICE.

HERMAN LUER, OF ALTON, ILLINOIS.

WASHING-MACHINE.

1,210,959.   Specification of Letters Patent.   Patented Jan. 2, 1917.

Application filed August 11, 1916.   Serial No. 114,405.

*To all whom it may concern:*

Be it known that I, HERMAN LUER, a citizen of the United States, residing at Alton, Madison county, Illinois, have invented a certain new and useful Improvement in Washing-Machines, of which the following is a full, clear, and exact description, such as will enable others skilled in the art to which it appertains to make and use the same, reference being had to the accompanying drawings, forming part of this specification, in which—

This invention relates broadly to butchering or meat packing, and more specifically to an improved form of machine for washing and cleaning certain parts of animals which are used in the manufacture and packing of certain butchers' products.

Parts of certain of the internal organs of various animals are utilized in packing various meat products as, for example, the stomachs of hogs, which are utilized as a container or covering for such products as headcheese, football sausage, and the like. These parts of the animal are lined with a very tenacious mucous membrane, which, due to its sticky and viscous nature, is very hard to remove. Heretofore the only practical method of removing this membrane has been to turn the organ inside out and wash off the membrane by hand with a stiff brush. This is necessarily an expensive method due to the large labor cost and the large amount of time required.

It is the general object of my invention to provide an improved form of washing machine which is especially designed for the cleaning of such parts and which will handle a considerable number of pieces at an operation and cleanse them all thoroughly without injuring them.

Other various specific objects of the device will be hereinafter indicated, or obvious upon an understanding of the structure.

In the accompanying drawings, wherein one embodiment of the invention is disclosed for the purpose of illustration, Figure 1 represents a side elevation of the machine with parts of the outer casing broken away. Fig. 2 is a full top view of one of the scraping flights. Fig. 3 is a vertical transverse section, and Fig. 4 is a detail illustrative of the cross sectional form of the scraping flights and foraminous cylinder.

Referring to these drawings by the reference numerals, let it be understood that 1 represents a suitable supporting standard, of which there are two, one disposed at each end of the machine. Extending intermediate these standards and supported thereon is a semi-cylindrical casing portion 2 forming a trough. This casing portion has a depressed part 4 extending longitudinally of its lower portion, which depressed part increases in depth toward one end of the machine to form a drain trough, as will be readily understood by reference to Fig. 1. A suitable gate 5 is arranged to control the outlet of said drain trough.

Hinged at one side of the standards 1 is a casing portion forming a semi-cylindrical cover 6 made up of segments hinged to each other and all arranged so as to coöperate in complementary fashion with the trough portion 2 to form a horizontally disposed cylindrical casing. Both the trough portion 2 and cover portion 6 carry segmental end portions which fit together to form end walls of the cylindrical casing. Journaled on the standards 1 and extending longitudinally through and coaxially with the cylindrical casing is the operating shaft 7 which is suitably equipped with transmission or driving means 8 whereby it may be rotated. Mounted for rotation with this shaft adjacent each end of the casing is a disk 9, and extending intermediate and connecting said disk members are arcuate foraminous sheet metal sections 10 shaped to conform to the contour of the disks 9, and secured thereto in suitable fashion. One of said sections, as for example, the one marked 10', is arranged for ready removal so as to afford access to the chamber formed by the disks 9 and the sections 10, which latter are arranged in juxtaposition to one another to form a continuous wall around the disks. Of course the particular contour of the chamber thus formed will be dependent upon the contour of the disks 9 and may be polyangular as well as round, as illustrated. Within the chamber thus formed are mounted the scraping flights 11 which are in the nature of sheet metal strips extending intermediate the disks 9 and suitably secured thereto at their extremities. These flights are disposed so that their transverse dimension extends tangentially relative to a circle concentric of the shaft 7 and their width is such as to leave a considerable space between their outer edges and the sections 10.

The foraminous sections 10, and likewise the flights 11, are formed by punching out portions of the sheet metal to form the apertures 12, in such fashion that a bur 14 is formed projecting from one side of the sheet about each aperture. The apertures are disposed relatively close to one another so that the burs form a rough surface. Obviously the apertures may be of any desired or convenient contour, those shown being circular. The burs about the apertures, however, which form scraping or abrading edges, should be continuous; that is, they should not be interrupted so as to have sharp corners which would form entering or puncturing points, as the presence of such corners or points on these abrading elements would tend to scratch, puncture, or injure the parts which it is desired to clean. By making these burs or abrading edges continuous and uninterrupted, I insure the safety and integrity of the parts which it is desired to clean. The burs on the sections 10 extend inwardly toward the shaft, while those on the flights extend outwardly from the shaft.

Suitably supported within the casing portion 2 and extending longitudinally thereof is a water pipe 15 suitably connected to a source of supply and controlled by proper valves. Said pipe has a series of nozzles or injecting apertures distributed throughout its length and directed toward the foraminous inner cylinder.

In the operation of the device a suitable number of animal parts to be cleaned are disposed within the revoluble cylinder through the aperture afforded by the removal of the section 10', the parts, as in the case of hogs' stomachs, above referred to, being turned inside out to expose the side bearing the tenacious material. The water control is then operated to inject water through the pipe 15, and the driving mechanism is operated to rotate the revoluble cylinder, as in the direction indicated by the arrows in Fig. 3. Upon the rotation of the cylinder the animal parts will be carried up on the roughened surfaces of the sections 10, and also on the surfaces of the flights 11 to the point where their angle of rest is exceeded, whereupon they will slide or skate down over the roughened surfaces of the cylinder wall and flights. In this movement the parts are subjected to an abrading or scraping action from the bosses or burs 14, which manipulation scrapes off portions of the viscous membrane which it is desired to remove. Likewise the flights moving through the mass of the parts, which tends to remain at the lower portion of the cylinder, will operate with similar effect. The injection of water from the pipe 15 is continued, and in addition to supplying the necessary water to flush the animal parts, it carries away any of the material which may adhere to the cylinder walls and to the flights, as the force of the streams operating through the apertures in the sections 10 carries it to the flight members 11. From time to time the water may be allowed to drain off through the trough 4 so as to flush out the sticky, detached material. This operation is continued for such time as it may be necessary to remove the undesirable adherent material from the parts, and thereupon the cylinder may be stopped, the section 10' removed, and the cylinder then rotated to discharge the cleansed parts into the trough portion 4, through which they will slide down to a suitable receptacle.

By means of this device I am enabled to cleanse at one operation a large number of the parts, and to remove all of the undesirable adherent material in a comparatively short time, without injury to the portions whose integrity it is desired to maintain.

I desire it to be understood that this machine is equally useful for washing animal parts other than those specifically referred to, but that it is particularly efficacious in the cleansing of any of the parts which are of a flaccid nature and from which it is desired to remove a tenacious, viscous, sticky, or slimy material.

I am aware that the device is susceptible of various changes and modifications, not herein specifically illustrated or described, without departing from the spirit of the invention and the scope thereof as indicated in the appended claims.

I claim:

1. A machine for the cleansing of animal parts comprising a suitable inclosing casing, a revoluble foraminous casing supported therein and spaced apart from the walls thereof and having its inner wall formed with abrading or scraping projections, flights disposed within and revoluble with said foraminous casing and spaced apart from the inner wall thereof, said flights being formed with foraminous abrading surfaces, means for injecting water against the foraminous casing and flights, and means for rotating the same.

2. A machine of the class described including a foraminous casing mounted for rotation on a horizontal axis, said casing having inwardly projecting abrading portions, flights disposed within said casing and rotatable therewith, said flights being spaced apart from the inner wall of the casing and having abrading surfaces, means for rotating the casing, and means for injecting a liquid through the foraminous rotating portions of said casing.

3. A machine of the class described including a container, means for rotating said container on a horizontal axis, said container being formed with peripheral apertures and inwardly presented burs forming the boundaries of said apertures, and means for injecting liquid into said container through said apertures during the rotation of the container.

4. A machine of the class described including a container mounted for rotation on a horizontal axis, said container having a foraminous peripheral wall with inwardly projecting burs about the apertures, flights mounted within the container for rotation therewith and having roughened foraminous surfaces extending at a tangential angle relative to the axis of the container, and means for rotating the container.

5. A machine of the class described including a container having a foraminous peripheral wall and mounted for rotation about a horizontal axis, flights disposed within said container for rotation therewith and spaced apart from the peripheral wall thereof, said flights having foraminous supporting surfaces with abrading projections extending away from the axis of the container, and said container being provided on its peripheral wall with abrading projections extending toward said axis.

6. In a machine of the class described, a revoluble arcuate container, and a foraminous flight member lying on a chord of the container and having continuous scraping edges extending in the direction of movement thereof.

7. In a machine of the class described, a container adapted for the reception of material to be cleaned, said container being mounted for rotation on a horizontal axis and having a foraminous peripheral wall about said axis with inwardly projecting continuous scraping edges thereon, and a flight mounted in the said container for rotation therewith and lying at an angle to the peripheral wall thereof; said flight being provided with continuous scraping edges.

8. In a machine of the class described, the combination of a trough like member, a foraminous casing mounted for rotation within said trough like member and formed to inclose the material to be cleansed, said casing carrying inwardly projecting scraping edges disposed adjacent the apertures therein, means for injecting a liquid into said casing through said apertures during the rotation of the casing, and means for permitting the withdrawal of the liquid from said trough member for the purpose described.

In testimony whereof I hereunto affix my signature in the presence of two witnesses, this 2nd day of Aug., 1916.

HERMAN LUER.

Witnesses:
W. F. LOELLKE,
S. H. WYN.